US012450382B2

(12) United States Patent
Lee et al.

(10) Patent No.: US 12,450,382 B2
(45) Date of Patent: Oct. 21, 2025

(54) SYSTEM AND METHOD FOR MULTIDIMENSIONAL RANGE SEARCHING FOR ENCRYPTED DATA AND APPARATUS FOR THE SAME

(71) Applicant: ELECTRONICS AND TELECOMMUNICATIONS RESEARCH INSTITUTE, Daejeon (KR)

(72) Inventors: Young Kyung Lee, Daejeon (KR); Ju Young Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 99 days.

(21) Appl. No.: 18/404,344

(22) Filed: Jan. 4, 2024

(65) Prior Publication Data

US 2025/0190611 A1 Jun. 12, 2025

(30) Foreign Application Priority Data

Dec. 12, 2023 (KR) .................. 10-2023-0179683

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC ................ G06F 21/6227; G06F 21/602
See application file for complete search history.

(56) References Cited

U.S. PATENT DOCUMENTS 6,711,563 B1 * 3/2004 Koskas ................. G06F 16/284
707/769
8,817,978 B2 * 8/2014 Jho ........................ H04L 9/0662
380/28
(Continued)

FOREIGN PATENT DOCUMENTS

EP          3 151 461 B1    6/2019
KR   10-2009-0079028 A    7/2009
(Continued)

OTHER PUBLICATIONS

Dongjie Li et al., "Frequency-Hiding Order-Preserving Encryption with Small Client Storage," VLDB, pp. 3295-3307, vol. 14, No. 3.

*Primary Examiner* — J. Brant Murphy
(74) *Attorney, Agent, or Firm* — Sughrue Mion, PLLC (57) ABSTRACT

The present invention relates to a system and a method for multidimensional range searching for encrypted data, and an apparatus for the same. A method for multidimensional range searching for encrypted data according to an aspect of the present invention may include: generating an order revealing encryption (ORE) index table for a plurality of record data, wherein each of the plurality of record data includes data for a plurality of attributes; receiving a query for multidimensional range searching for the first attribute and the second attribute for the plurality of record data; determining one or more ORE indexes that satisfies all of the multidimensional range in the ORE index table for any one of the first attribute and the second attribute; and determining a response to the query based on the one or more ORE indexes.

19 Claims, 7 Drawing Sheets

(56) References Cited

U.S. PATENT DOCUMENTS

| | | | |
|---|---|---|---|
| 9,037,860 B1* | 5/2015 | Kerschbaum | H04L 9/14 |
| | | | 713/168 |
| 9,646,166 B2* | 5/2017 | Cash | G06F 21/602 |
| 10,833,841 B2* | 11/2020 | Kerschbaum | H04L 9/002 |
| 10,885,216 B2* | 1/2021 | Hahn | G06F 16/3331 |
| 11,048,816 B2* | 6/2021 | Fuhry | G06F 21/6227 |
| 2006/0155394 A1* | 7/2006 | Syeda-Mahmood | G06F 18/00 |
| | | | 700/20 |
| 2010/0146299 A1* | 6/2010 | Swaminathan | G06F 21/6227 |
| | | | 707/E17.014 |
| 2013/0148803 A1* | 6/2013 | Jho | H04L 9/0861 |
| | | | 380/44 |
| 2016/0285623 A1* | 9/2016 | Yoon | G06F 21/6236 |
| 2018/0019866 A1* | 1/2018 | Kerschbaum | H04L 9/0618 |
| 2019/0220620 A1* | 7/2019 | Hahn | H04L 63/0428 |
| 2020/0320213 A1* | 10/2020 | Fuhry | G06F 16/2455 |
| 2023/0259641 A1* | 8/2023 | Lee | G06F 21/6218 |
| | | | 726/26 |

FOREIGN PATENT DOCUMENTS

| | | |
|---|---|---|
| KR | 10-2012-0135817 A | 12/2012 |
| KR | 10-2018-0028226 A | 3/2018 |
| KR | 10-2132685 B1 | 7/2020 |
| KR | 10-2022-0052858 A | 4/2022 |

* cited by examiner

| Index | Attribute1 -Name | Attribute2 -Age | Attribute3 -Weight | ... |
|---|---|---|---|---|
| 1 | Hong Gil Dong | 21 | 58 | ... |
| 2 | Kim Young Hee | 21 | 51 | ... |
| 3 | Lee Cheol soo | 25 | 61 | ... |
| 4 | Kim Doo Hwan | 25 | 84 | ... |
| 5 | Kim Young Jun | 34 | 60 | ... |
| 6 | Lee Young Ho | 34 | 66 | ... |
| 7 | Park Dae Gi | 34 | 70 | ... |

SYSTEM AND METHOD FOR MULTIDIMENSIONAL RANGE SEARCHING FOR ENCRYPTED DATA AND APPARATUS FOR THE SAME

CROSS-REFERENCE TO RELATED APPLICATIONS

This application claims the benefit of earlier filing date and right of priority to Korean Application No. 10-2023-0179683, filed on Dec. 12, 2023, the contents of which are all hereby incorporated by reference herein in their entirety.

TECHNICAL FIELD

The present disclosure relates to a method for facilitating encrypted data search (within range), and in more detail, relates to a system and a method for multidimensional range searching for encrypted data using index encryption, a size order of a data plaintext before encryption is preserved even after encryption to allow size comparison, and apparatus for the same.

BACKGROUND

As data management becomes more important in most industries, the size of the cloud database industry continues to grow. In order to safely use a cloud database, traditional password-based information protection technology is used rather than simply storing data in plaintext or cleartext format, however although this can provide high security, accessibility to encrypted data is greatly reduced. This is because when searching for a query that finds only the desired data in an encrypted database, the entire encrypted database must be decrypted to be able to search. If the cloud server is not trustworthy, it must be used without delegating the key for data protection, in this case, as the size of the encrypted database increases, the client's data accessibility decreases significantly.

TO solve this problem, encryption technologies that can provide database protection and accessibility at the same time are being researched and developed. Representative examples of recent modern encryption research include homomorphic encryption that can perform operations in an encrypted state, searchable encryption, order-preserving encryption, and order-revealing encryption.

SUMMARY

A technical object of the present disclosure is to provide a method for supporting multidimensional range querying/searching for encrypted data (i.e., range querying/searching for multiple attributes).

A technical object of the present disclosure is to provide a method for generating and searching an encrypted text of an index that enables multi-dimensional range querying/searching for encrypted data.

In addition, an additional technical object of the present disclosure is to provide a method for generating and searching an encrypted text of an index capable of multidimensional range searching in an encrypted database without the need for additional information exposure and data transmission by utilizing an order-preserving encryption technology and an order-revealing encryption technology.

The technical objects to be achieved by the present disclosure are not limited to the above-described technical objects, and other technical objects which are not described herein will be clearly understood by those skilled in the pertinent art from the following description.

A method for multidimensional range searching for encrypted data according to an aspect of the present invention may include: generating an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute; receiving a query for multidimensional range searching for the first attribute and the second attribute for the plurality of record data; determining one or more ORE indexes that satisfies all of the multidimensional range in the ORE index table for any one of the first attribute and the second attribute; and determining a response to the query based on the one or more ORE indexes.

An apparatus for multidimensional range searching for encrypted data according to an additional aspect of the present invention may include: at least one processor; and at least one memory operably connected to the at least one processor and storing instructions that, when executed by the one or more processors, cause the apparatus to perform operations. The operations may include: generating an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute; receiving a query for multidimensional range searching for the first attribute and the second attribute for the plurality of record data; determining one or more ORE indexes that satisfies all of the multidimensional range in the ORE index table for any one of the first attribute and the second attribute; and determining a response to the query based on the one or more ORE indexes.

At least one non-transitory computer-readable medium storing at least one instruction according to an additional aspect of the present invention, wherein the at least one instruction executable by at least one processor may control an apparatus for multidimensional range searching for encrypted data to: generate an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute; receive a query for multidimensional range searching for the first attribute and the second attribute for the plurality of record data; determine one or more ORE indexes that satisfies all of the multidimensional range in the ORE index table for any one of the first attribute and the second attribute; and determine a response to the query based on the one or more ORE indexes.

Preferably, a position range corresponding to the query according to the order of size of data values for each of the first attribute and the second attribute may be determined.

Preferably, based on an encrypted text in which i) a first position range for a reference attribute that is one of the first attribute and the second attribute, and ii) a second position range for a target attribute that is the other one of the first attribute and the second attribute are encrypted using an ORE key, the one or more ORE indexes may be determined as one or more ORE indexes corresponding to the encrypted text among mapping relations corresponding to the first position range in the ORE index table for the reference attribute.

Preferably, among the first attribute and the second attribute, the reference attribute may be determined as an attribute with a smaller number of data among the number of data corresponding to the first position range and the number of data corresponding to the second position range.

Preferably, the first position range and the second position range may be determined based on a frequency table for each of the reference attribute and the target attribute, respectively, and the frequency table may be composed of frequency of data values for a specific attribute for the plurality of record data.

Preferably, a search index table for each of the first attribute and the second attribute for the plurality of record data may be generated, and the search index table may be composed of encrypted indexes of in which indexes for the plurality of record data are encrypted based on order preserving encryption (OPE).

Preferably, one or more encrypted indexes that correspond to position values of the reference attribute for the one or more ORE indexes may be determined in the search index table for the reference attribute.

Preferably, a database by encrypting the plurality of record data using a secret key may be constructed.

Preferably, one or more record data obtained from the database using one or more indexes obtained by decrypting the one or more encrypted indexes may be determined as the response.

According to an embodiment of the present invention, it can simultaneously provide high security through database encryption and high data accessibility through complex range searching of multiple attributes.

In addition, according to an embodiment of the present invention, searching is possible even in an encrypted state without exposing information to the server or decrypting the entire data.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Since the present disclosure can make various changes and have various embodiments, specific embodiments will be illustrated in the drawings and described in detail in the detailed description. However, this is not intended to limit the present disclosure to specific embodiments, and should be understood to include all changes, equivalents, and substitutes included in the feature and technical scope of the present disclosure. Similar reference numbers in the drawings refer to identical or similar functions across various aspects. The shapes and sizes of elements in the drawings may be exaggerated for clearer explanation. For a detailed description of the exemplary embodiments described below, refer to the accompanying drawings, which illustrate specific embodiments by way of example. These embodiments are described in sufficient detail to enable those skilled in the art to practice the embodiments. It should be understood that the various embodiments are different from one another but are not necessarily mutually exclusive. For example, specific shapes, structures and characteristics described herein with respect to one embodiment may be implemented in other embodiments without departing from the spirit and scope of the disclosure. Additionally, it should be understood that the position or arrangement of individual components within each disclosed embodiment may be changed without departing from the spirit and scope of the embodiment. Accordingly, the detailed description that follows is not to be intended in a limiting sense, and the scope of the exemplary embodiments is limited only by the appended claims, together with all equivalents to what those claims assert if properly described.

In the present disclosure, terms such as first, second, etc. may be used to describe various components, but the components should not be limited by the terms. The above terms are used only for the purpose of distinguishing one component from another. For example, a first component may be referred to as a second component, and similarly, the second component may be referred to as a first component without departing from the scope of the present disclosure. The term "and/or" includes any of a plurality of related stated items or a combination of a plurality of related stated items.

When a component of the present disclosure is referred to as being "connected" or "accessed" to another component, it may be directly connected or connected to the other component, but other components may exist in between. It must be understood that it may be possible. On the other hand, when it is mentioned that a component is "directly connected" or "directly accessed" to another component, it should be understood that there are no other components in between.

The components appearing in the embodiments of the present disclosure are shown independently to represent different characteristic functions, and do not mean that each component is comprised of separate hardware or one software component. That is, each component is listed and included as a separate component for convenience of explanation, and at least two of each component can be combined to form one component, or one component can be divided into a plurality of components to perform a function, and each of these components can be divided into a plurality of components. Integrated embodiments and separate embodiments of the constituent parts are also included in the scope of the present disclosure as long as they do not deviate from the essence of the present disclosure.

The terms used in this disclosure are only used to describe specific embodiments and are not intended to limit the disclosure. Singular expressions include plural expressions unless the context clearly dictates otherwise. In the present disclosure, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. In other words, the description of "including" a specific configuration in this disclosure does not exclude configurations other than the configuration, and means that additional configurations may be included in the scope of the implementation of the disclosure or the technical feature of the disclosure.

Some of the components of the present disclosure may not be essential components that perform essential functions in the present disclosure, but may simply be optional components to improve performance. The present disclosure can be implemented by including only essential components for implementing the essence of the present disclosure, excluding components used only to improve performance, and a structure that includes only essential components excluding optional components used only to improve performance. is also included in the scope of rights of this disclosure.

Hereinafter, embodiments of the present disclosure will be described in detail with reference to the drawings. In describing the embodiments of the present specification, if it is determined that a detailed description of a related known configuration or function may obscure the gist of the present specification, the detailed description will be omitted, and the same reference numerals will be used for the same components in the drawings. Redundant descriptions of the same components are omitted.

Hereinafter, the present invention presents a method for generating and searching an encrypted index that enables multidimensional range queries by utilizing Order-Preserving Encryption (OPE) technology and Order-Revealing Encryption (ORE) technology.

Order-Preserving Encryption refers to an encryption technology in which when data that can be compared for size is encrypted, the encrypted text can also be compared for size and the size order before encryption is maintained. For example, when data with a case relationship of A<B is encrypted with order preservation, the case relationship of OPEnc(A)<OPEnc(B) is maintained. Here, OPEnc(A) is data obtained by order-preserving encryption of A data, and OPEnc(B) is data obtained by order-preserving encryption of B data. The most typical application of order-preserving cryptography is to provide range search functionality for encrypted data.

Order-preserving encrypted data (e.g., OPEnc(A), OPEnc(B), . . . ) of the data in the database (e.g., A, B, . . . ) can be stored in the database. Afterwards, when a range search query is needed from a user, an external system, etc., the query can be encrypted to preserve order, and the results of the range search query can be output through size comparison with the encrypted text. While protecting database data through order-preserving encryption, it is also possible to efficiently access data through range search queries without decrypting the entire data (i.e., preventing exposure of data values).

Order-Revealing Encryption refers to an encryption system that allows comparison of the sizes of two encrypted texts in an encrypted state similar to order-preserving encryption. As described above, order-preserving encryption can compare the size of the encrypted text itself, whereas order-revealing encryption differs in that the size of two encrypted texts can be checked using a comparison function. For example, when data with a case relationship of A<B is encrypted with order-revealing encryption and two encrypted texts OREnc(A) and OREnc(B) are given, size comparison is possible using the Comp(OREnc(A), OREnc(B)) function. Here, OREnc(A) is data obtained by order-revealing encryption of data A, and OREnc(B) is data obtained by order-revealing encryption of data B, Comp(x, y) refers to a function that compares the size between x and y data.

However, because searching an encrypted database using an existing order-preserving encryption or order-revealing encryption is only possible for one data attribute whose size can be compared, complex queries combining multidimensional attributes commonly used in actual database queries cannot be processed at once. That is, in order to search for record data (or records, data) that satisfies the range A<X<B in the first attribute and simultaneously satisfies the range C<Y<D in the second attribute, after performing an encrypted database search on each attribute to obtain first record data and second record data that satisfy the range for each attribute, additional work is needed to select record data that ultimately satisfies the ranges for both attributes by checking the query results (i.e., selection within first record data and second record data). Here, when the additional work (i.e., selectin work) is delegated and performed by a specific server, unnecessary information exposure may occur, and if this additional work (i.e., selection) is performed on the client, inefficient data transmission and additional work are required.

The purpose of the present invention is to present an efficient technology for complex querying record data with multidimensional attribute values in an encrypted database that can be used in environments where database management and information protection are important. If the client encrypts and stores data for protection in a completely untrusted environment, such as a cloud database server, data retrieval becomes difficult. An efficient way to solve this problem is to use order-preserving encryption or order-revealing encryption to process queries such as range search even on encrypted data.

However, even if an encrypted database search using an existing order-preserving encryption or order-revealing encryption is used, the existing method allows queries such as range queries only on data with a single attribute value. Therefore, in order to perform a complex query of multidimensional attributes on record data with various attribute values, inefficient resource burden such as exposure of additional information or additional transmission occurs. To solve this problem, we propose an index ciphertext generation and search method for searching an encrypted database that can technically process multidimensional complex queries without the need for additional information exposure or additional transmission.

In order to solve this problem, the present invention proposes a method for generating and searching encrypted indexes that enable multidimensional range searching in an encrypted database without the need for additional information exposure and data transmission using order-preserving encryption (OPE) and order-exposure encryption (ORE) technologies.

Figure 1:
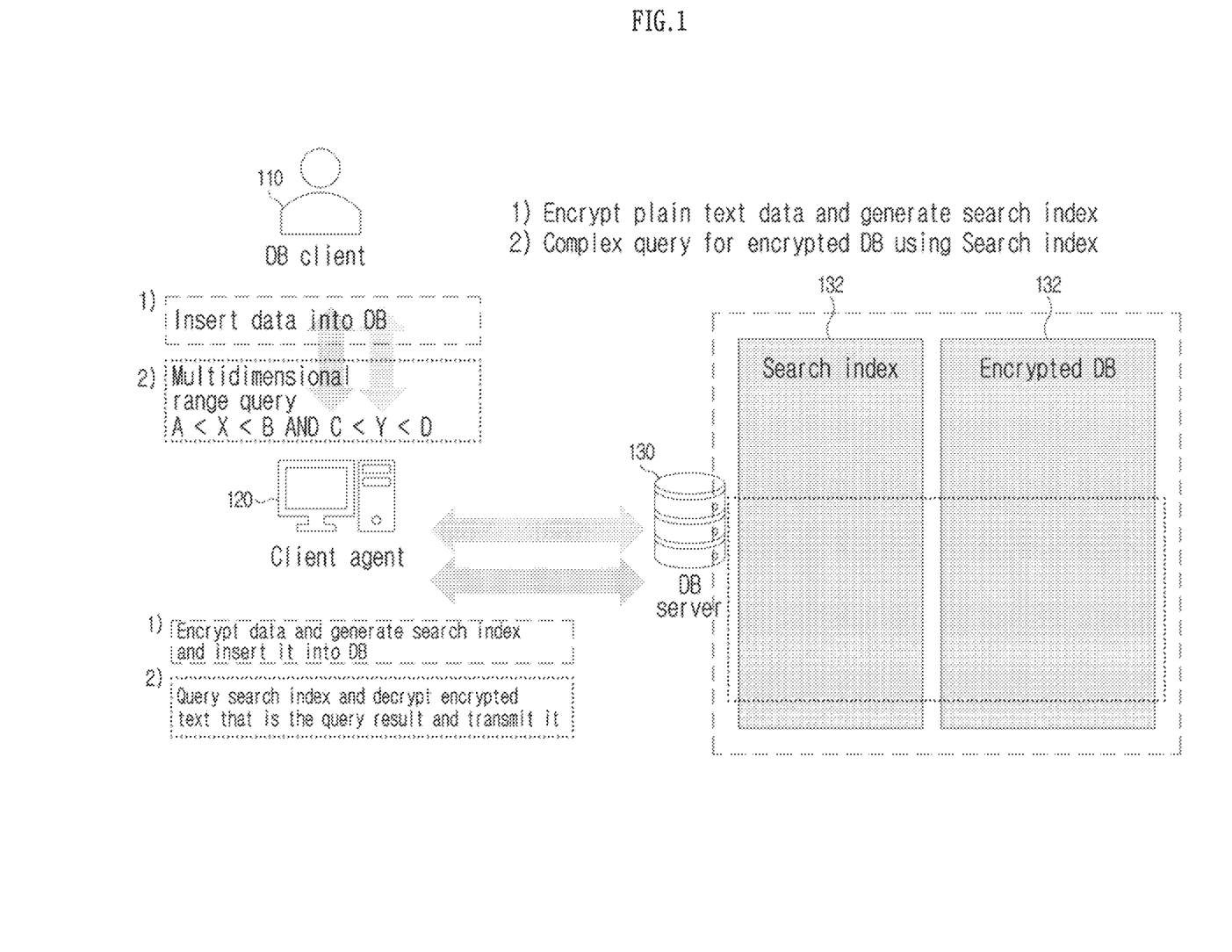
FIG. 1 illustrates a system configuration for multidimensional range searching for encrypted data according to an embodiment of the present invention.

FIG. 1 illustrates a system configuration for multidimensional range searching for encrypted data according to an embodiment of the present invention.

Referring to FIG. 1, a system for multidimensional range searching for encrypted data according to the present invention may be configured to include a client 110, a client agent 120, and a database (DB) server 130.

The client 110 (or DB client) can insert record data with multidimensional attributes of data that can be compared in size into a database, and perform complex range searching on multidimensional attributes.

The client agent 120 may encrypt data received from the client 110, store it in the database server 130, and act as an intermediary to support a search in the encrypted database 130.

The database server 130 provides general storage and query-and-answer functions. The database server 130 may be composed of a search index 132 and an encrypted DB 131.

The client agent 120 can perform two functions according to the request of the client 110. The first is data insertion, where when plaintext data is received from the client 110, the client agent 120 may encrypt the data using a secret key, generates a search index, and store the generated encrypted index and encrypted texts (i.e., the result of encrypting the data) in the database server 130. For example, the encrypted index may be stored in the search index 132, and the data encrypted text may be stored in the encrypted DB 131. In other words, this function corresponds to step 1 of encrypting plaintext data and generating a search index in FIG. 1.

The second is a search query response, where when the client agent 120 receives a complex range query (e.g., a complex range query of two attributes A<X<B and C<Y<D) for multidimensional (i.e., multiple) attributes from the client 110, the client agent 120 may transform it into a query for efficient query processing in the encrypted database and query (i.e. search index query) the database server 130, decrypt the encrypted text (i.e. query result) received from the database server 130 and transmit a response in the form of plaintext to the client 110. In other words, this function corresponds to step 2 of performing a complex query for an encrypted text using the search index in FIG. 1 and obtaining the query result.

Figure 2:
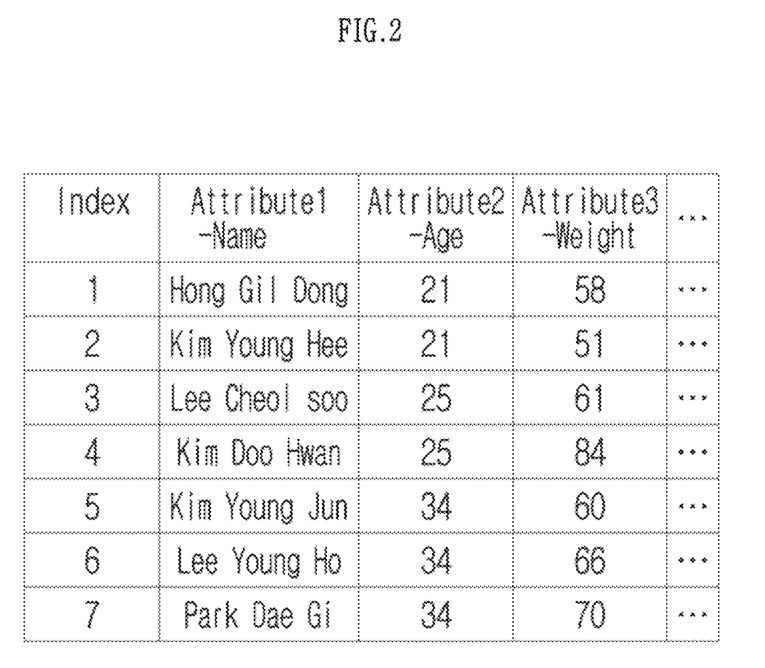
FIG. 2 illustrates a form of data that can be applied to a system according to an embodiment of the present invention.

Data subject to encryption in the present invention may have the form of a table composed of record data with various attributes, as shown in FIG. 2.

FIG. 2 illustrates a form of data that can be applied to a system according to an embodiment of the present invention.

Referring to FIG. 2, each record (or record data) corresponds to one row in the table shown in FIG. 2, and each record may include an index, attribute 1 (name), attribute 2 (age), attribute 3 (weight), etc. In FIG. 2, only attributes 1 to 3 are illustrated for convenience of explanation, but the present invention is not limited thereto and record data with various attributes may be used.

Here, an encrypted index is generated that can perform a range query in an encrypted state for attributes (attribute 2 and attribute 3 in FIG. 2) including attribute values that can be compared in order/size. Duplicate attribute values are allowed, and the search results using the encrypted index are designed to answer questions by returning the index of the record data that satisfies the search conditions (i.e., the first column in FIG. 2).

The encryption process proposed in the present invention is as follows. It can be broadly divided into encrypted search index generation and encrypted text DB generation.

First, according to the encrypted text DB generation process, only the data portion (i.e. data part for attributes 1 to 3) of the encryption target table (e.g. table in FIG. 2) may be encrypted with a probabilistic symmetric key encryption algorithm (e.g., Advanced Encryption Standard (AES)—Cipher Block Chaining (CBC)) to generate a table including an index and data encrypted text attributes, and they may be stored in the DB server (i.e. encrypted DB).

Next, the search index generation process is described with reference to the drawing below.

Figure 3:
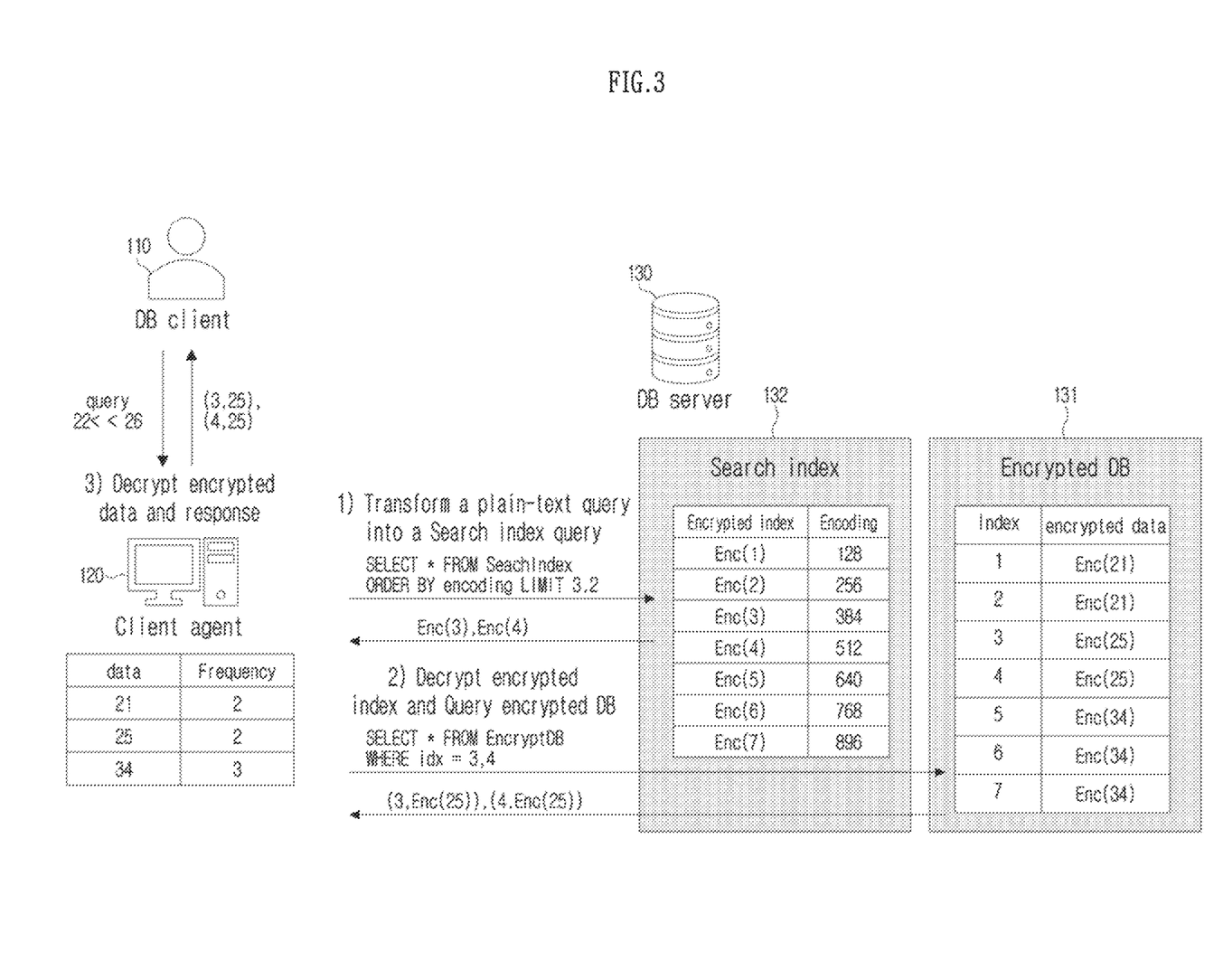
FIG. 3 is a diagram illustrating a search index generation process according to an embodiment of the present invention.

FIG. 3 is a diagram illustrating a search index generation process according to an embodiment of the present invention.

Referring to FIG. 3, as described above, the encrypted text DB (i.e., encrypted DB) may encrypt the data for attribute 2 (age) of the table in FIG. 2 using a probabilistic symmetric key encryption algorithm to store record data including an index (index in the table in FIG. 2) and data encrypted text (i.e., encrypted data for attribute 2) (Enc(21), Enc(21), Enc(25), Enc(25), Enc(34), Enc(34), Enc(34)). In addition, in FIG. 3, only attribute 2 is illustrated for convenience of explanation, but other attributes can also be encrypted using a probabilistic symmetric key encryption algorithm and record data for each index can be stored.

Additionally, an OPE-based search index can be generated using a different encryption key for each attribute by utilizing the client storage order-preserving encryption (scsOPE) method. FIG. 3 specifically illustrates the search index generation process for attribute 2 in the table of FIG. 2. In FIG. 3, the search index (SearchIndex) may include an encrypted index (e.g., the value of each index of the encrypted DB encrypted with a probabilistic symmetric key encryption algorithm) and an encoded value (i.e. OPE-based search index). Here, the encoded value (i.e., OPE-based search index) can be encrypted as 128, 256, 384, 512, 640, 768, 896 according to the size order of the encryption data of the encrypted DB (in FIG. 3, encrypted data for attribute 2, Enc(21), Enc(21), Enc(25), Enc(25), Enc(34), Enc(34), Enc(34)).

A search method for the encrypt text database is described. When the DB client 110 queries the client agent 120 with a query such as 22<X<26, the client agent 120 searches the search index (i.e., transmitting a query to the search index 132 in the DB server 130) by referring to a frequency table and transforming it into a search index query (SELECT*FROM SearchIndex ORDER BY encoding LIMIT 3,2). Here, the frequency table is a table representing the frequency of attribute values, and based on this, the client agent can check the size order of data (i.e., the value for attribute 2). The frequency table generated through the database encryption (Encrypted DB) and encrypted index (SerchIndex) generation process is stored in the client storage 121 as sensitive status information and can be managed by the client agent 120. Referring to the frequency table in FIG. 3, it can be seen that there are two pieces of data that satisfy 22<X<26. In other words, the search index query (SELECT*FROM SearchIndex ORDER BY encoding LIMIT 3,2) can be interpreted as querying two pieces of data starting from the third data in ascending order of size. In response to the search index query, the client agent 120 may receive two data Enc(3) and Enc(4) from the DB server 130 (i.e., search index (132) of DB server), starting with the third data in ascending order of size. Next, the client agent 120 can obtain values 3 and 4 by decrypting the received encrypted index. Subsequently, the client agent 120 may transmit a query (SELECT*FROM EncryptDB WHERE idx=3, 4) for the data of indexes 3 and 4 to the DB server 130 (i.e., the encrypted DB 131 of the DB server). Additionally, the client agent 120 may receive data for indexes 3 and 4 in response to the query from the DB server 130 (i.e., the encrypted DB 131 of the DB server) (e.g., pairs of index and data, {3, Enc(25)}, {4, Enc(25)}). The client agent 120 may decrypt the encrypted data (i.e., Enc(25), Enc(25)) and respond/transmit the index and the decrypted data (i.e. actual data values) ({3, 25}, {4, 25}) to the client 110.

FIG. 3 illustrates the process of encrypting one attribute and storing it in the DB server 130, and searching for data corresponding to a specific range through a search index.

However, in order to enable multi-dimensional range searching according to the present invention, the client agent 120 must search based on order revealing encryption (ORE) to perform complex query processing without exposing information in the range search results for each attribute. Additional indexes can be generated. This will be described with reference to the drawings.

Figure 4:
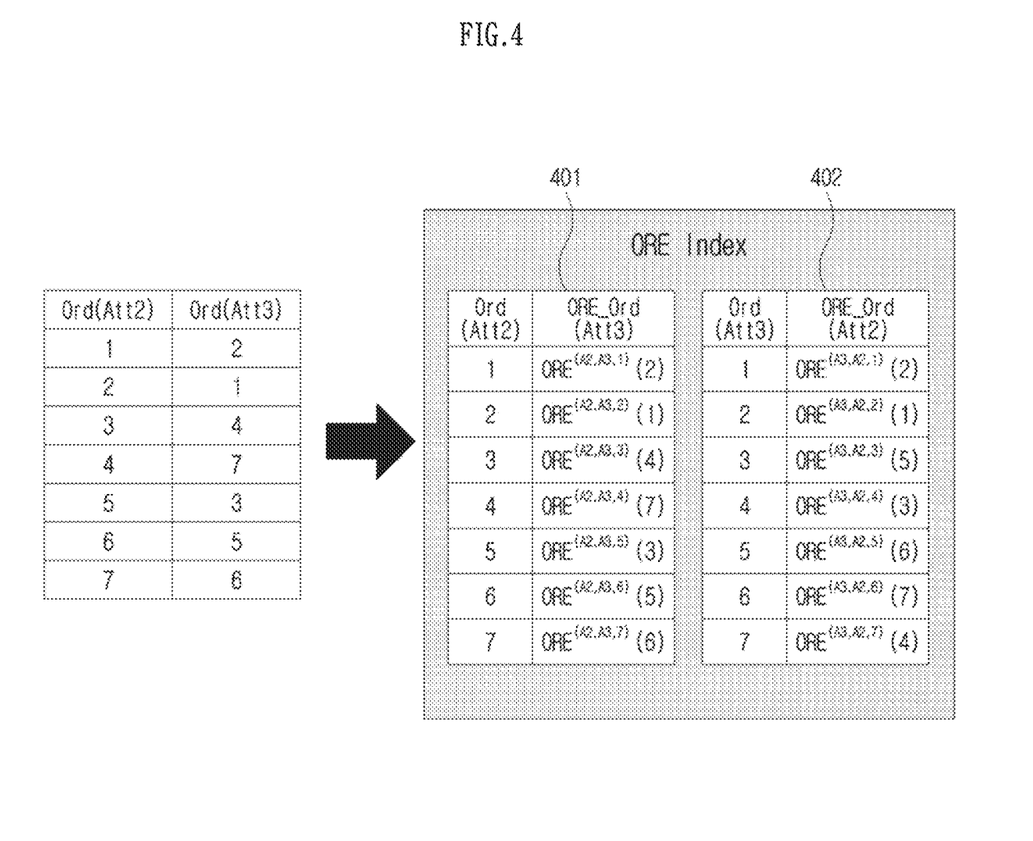
FIG. 4 is a diagram illustrating a search index generation process for a multidimensional range according to an embodiment of the present invention.

FIG. 4 is a diagram illustrating a search index generation process for a multidimensional range according to an embodiment of the present invention.

FIG. 4 illustrates a method for generating a search index for a multidimensional range based on ORE.

The client agent 120 first organizes indexes in table form according to the size order (in ascending order) of the attributes of the record data for attributes whose sizes can be compared (In the example of FIG. 2, attribute 2—age, attribute 3—weight). That is, the Ord(Att2) column indicates that the index is listed in ascending order of the size of the data for attribute 2 (age), and he Ord(Att3) column indicates that the indices are listed in ascending order of the size of the data for attribute 3 (weight).

Here, the reference attribute is configured for each attribute (i.e., the attribute that corresponds to the order in which indexes are listed in the ORE index table), and the size-ordered numbers of the remaining attribute(s) (i.e., target attribute(s)) are ORE-encrypted and stored. Here, the ORE encryption key can be determined by the size order number of the reference attribute, target attribute, and reference attribute. For example, in FIG. 4, the ORE encryption key for $ORE^{(A2,A3,1)}$ (2) data may be determined as reference attribute=A2, target attribute=A3, and a size order number of reference attribute 15=1. Referring to the ORE index table, the first ORE index table 401 illustrates a case where the reference attribute is attribute 2, and the index for attribute 3, which is the target attribute, can be encrypted using the ORE encryption key described above. For example, indexes for the target attribute can be encrypted, such as the encrypted index for index 2 of the target attribute (attribute 3) is $ORE^{(A2,A3,1)}$ (2), and the encrypted index for index 1 of the target attribute (attribute 3) is $ORE^{(A2,A3,2)}$ (1), etc. In addition, similarly, the second ORE index table 401 illustrates a case where the reference attribute is attribute 3, and the index for attribute 2, which is the target attribute, may be encrypted using the above-described ORE encryption key. For example, indexes for the target attribute can be encrypted, such as the encrypted index for index 2 of the target attribute (attribute 2) is $ORE^{(A3,A2,1)}$ (2), and the encrypted index for index 1 of the target attribute (attribute 3) is $ORE^{(A3,A2,2)}$ (1), etc.

Figure 5:
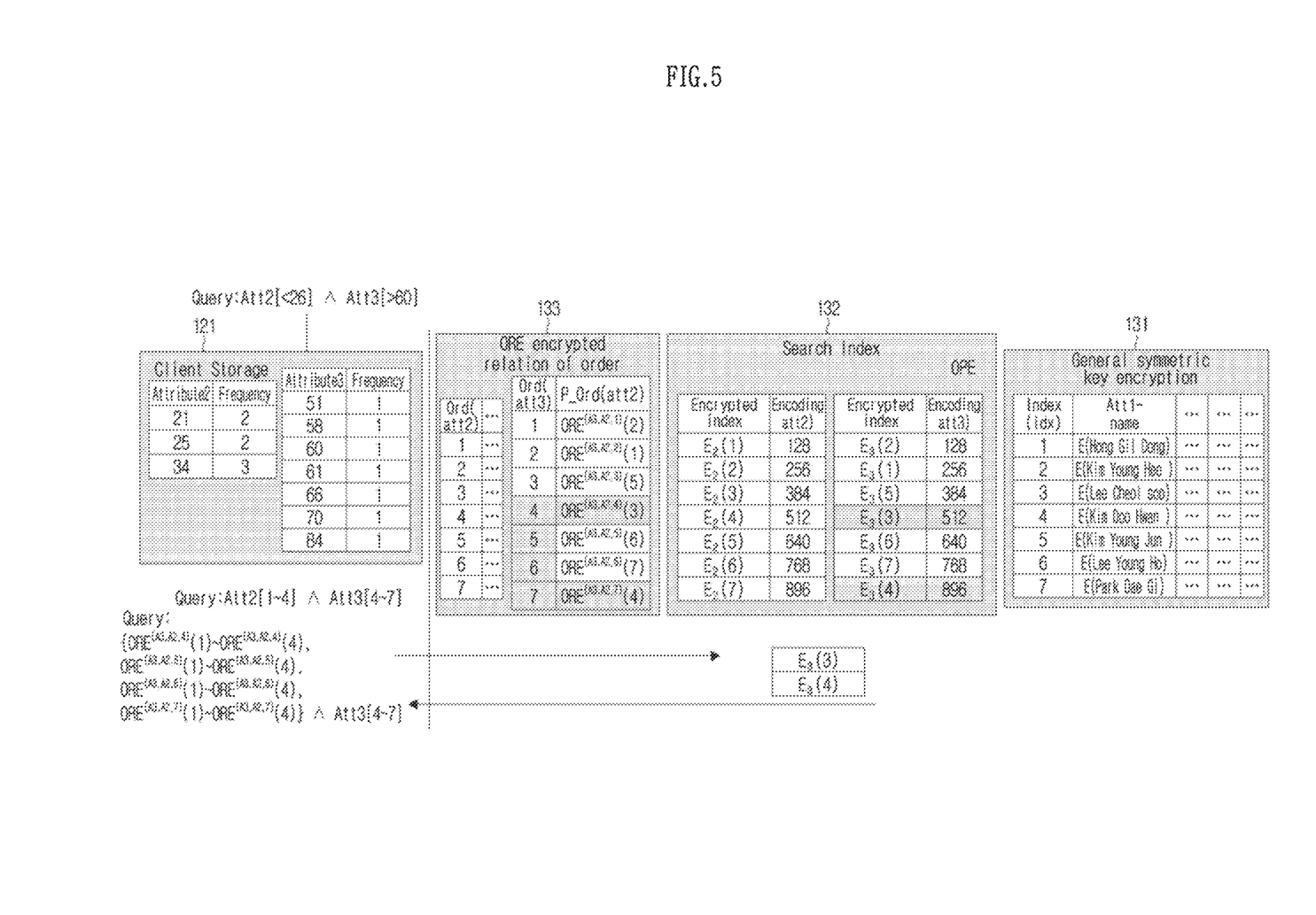
FIG. 5 illustrates a method of searching encrypted data using a search index for a multidimensional range according to an embodiment of the present invention.

FIG. 5 illustrates a method of searching encrypted data using a search index for a multidimensional range according to an embodiment of the present invention.

Referring to FIG. 5, record data encrypted with a general symmetric key (i.e. encrypted DB, 131), an encrypted index generated based on OPE (i.e. search index, 132) and an encrypted index generated based on ORE (i.e., ORE encrypted relation of order, 133) to the same method as the examples in FIGS. 3 and 4 are stored in the DB server 130.

As described above, in the encrypted DB 131, each attribute value in the actual record data can be encrypted using a probabilistic symmetric key encryption algorithm and stored in table form. In other words, E (Hong Gil-dong) in the encrypted DB 131 corresponds to the encrypted text encrypting the name 'Hong Gil-dong'.

Additionally, the search index 132 may store an encrypted search index for each attribute based on an order-preserving encryption (OPE) method. That is, the search index table for each attribute (Att2 or Att3) may include an encrypted index that encrypts the index and an encoded value (i.e., an OPE-based search index) and the size order for the encoded value is the same as the data size order for the corresponding attribute. In other words, the actual data size for the corresponding attribute can be confirmed using the size order of the encoded values in the search index table.

In addition, in the ORE encrypted relation of order (133), as described in FIG. 4, indexes are listed in the ORE index table according to the reference attribute, and the index for the target attribute is stored in ORE-encrypted numbers according to size order. FIG. 5 illustrates an ORE index table in which attribute 3 (Att3) corresponds to the reference attribute and attribute 2 (Att2) is the target attribute.

First, when the client 110 requests a multidimensional range query to the client agent 120 (e.g., querying record data where the data value for attribute 2 is less than 26 and the data value for attribute 3 is greater than 60), the client agent 120 uses the frequency table of each attribute stored in the client storage 121 to calculate position values according to the size order of data corresponding to the query result. For example, the client agent 120 can use the frequency table of each attribute to confirm that the data positions for attribute 2 are 1 to 4 (i.e. 4 pieces of data starting from the first data) and the data positions for attribute 3 are 4 to 7 (i.e. 4 pieces of data starting from the fourth data).

Here, the client agent 120 can configure a specific attribute among the two attributes as the reference attribute and configure the remaining attribute as the target attribute. Then, the client agent 120 encrypts the start and end values of the position range for the remaining target attribute using the ORE key determined by [reference attribute, target attribute, position value], and generates a query including the corresponding encrypted text ({$ORE^{(A3,A2, 4)}$ (1)~$ORE^{(A3,A2, 4)}$ (4), $ORE^{(A3,A2,5)}$ (1)~$ORE^{(A3,A2,5)}$ (4), $ORE^{(A3,A2,6)}$ (1)~$ORE^{(A3,A2,6)}$ (4) $ORE^{(A3,A2,7)}$ (1)~

ORE$^{(A3,A2,7)}$ (4)} in FIG. 5) and the position range (Att3 [4~7] in FIG. 5) for the reference attribute and queries the DB server 130.

Here, the attribute with the smallest number of data corresponding to the data range according to the query may be configured as the reference attribute. For example, in the example of FIG. 5, there are 4 pieces of data that satisfy the range for attribute 2 and 4 pieces of data that satisfy the range for attribute 3, so a case where attribute 3 is arbitrarily selected is illustrated.

The DB server 130 uses an ORE-based encrypted index table corresponding to the reference attribute in the query to perform a range check on the ORE encrypted texts in the corresponding range and the ORE encrypted texts received in the query. In FIG. 5, the DB server 130 can perform a range check between ORE encrypted texts in the range 4 to 7 {ORE$^{(A3,A2,4)}$ (3), ORE$^{(A3,A2,5)}$ (6), ORE$^{(A3,A2, 6)}$ (7), ORE$^{(A3,A2,7)}$ (4)} for attribute 3 that is the reference attribute and ORE encrypted texts in the query {ORE$^{(A3,A2, 4)}$ (1)~ORE$^{(A3,A2, 4)}$ (4), ORE$^{(A3,A2, 5)}$ (1)~ORE$^{(A3,A2,5)}$ (4), ORE$^{(A3,A2,6)}$ (1)~ORE$^{(A3,A2,6)}$ (4), ORE$^{(A3,A2,7)}$ (1)~ORE$^{(A3,A2,7)}$ (4)}. That is, in the example of FIG. 5, ORE$^{(A3,A2,4)}$ (3) and ORE$^{(A3,A2,7)}$ (4) can be determined to belong in the scope of the query.

Additionally, the DB server 130 can select only the position value of the reference attribute within the scope of the query as the query result. That is, the DB server 130 responds to the client agent 120 with the value of the OPE encrypted index (i.e., E3(3), E3(4)) corresponding to the position value (i.e., 4, 7) of the reference attribute.

The client agent 120 can obtain indexes 3 and 4 by decrypting the received encrypted index. Next, the client agent 120 may transmit a query (SELECT*FROM EncryptDB WHERE idx=3, 4) for the data of indexes 3 and 4 to the DB server 130 (i.e., the encrypted DB 131 of the DB server), and receive a response from the encrypted DB for the encrypted indexes. Then, the client agent 120 decrypts the received encrypted text data and transmits it to the client.

Figure 6:
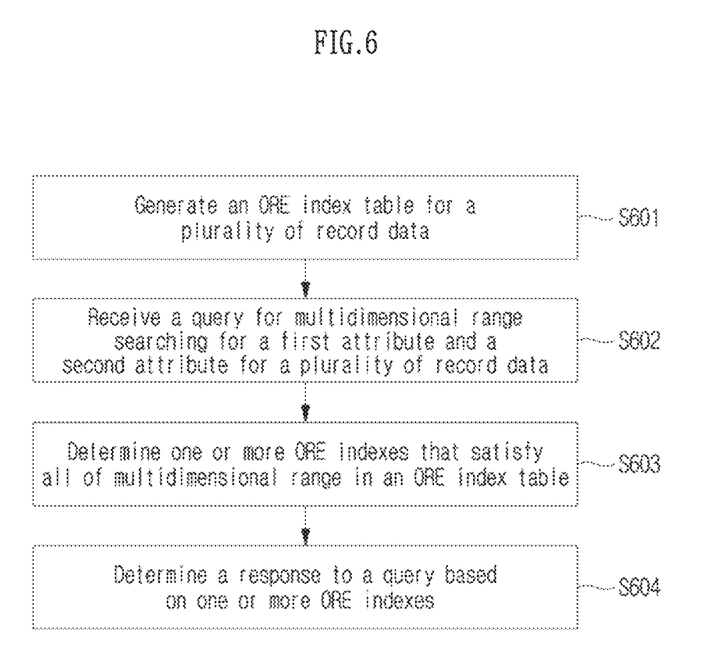
FIG. 6 illustrates a method for multidimensional range searching for encrypted data according to an embodiment of the present invention.

FIG. 6 illustrates a method for multidimensional range searching for encrypted data according to an embodiment of the present invention.

Referring to FIG. 6, an apparatus for multidimensional range searching for encrypted data generates an ORE index table for a plurality of record data (S601).

Here, each of the plurality of record data may include data for a plurality of attributes.

In addition, among the plurality of attributes, each ORE index table may be generated for each of a first attribute and a second attribute that allow comparison of size of data values.

In addition, each ORE index table is composed of mapping relations between i) an index indicating an order for size of data values for any one of the first attribute and the second attribute and ii) an ORE index, which is an ORE-based encrypted index indicating an order number for size of data values for the other attribute.

Although not shown in FIG. 6, an apparatus for multidimensional range searching for encrypted data may generating a search index table for each of the first attribute and the second attribute for the plurality of record data. Here, the search index table may be composed of encrypted indexes of in which indexes for the plurality of record data are encrypted based on order preserving encryption (OPE).

In addition, although not shown in FIG. 6, an apparatus for multidimensional range searching for encrypted data may construct a database by encrypting the plurality of record data using a secret key.

An apparatus for multidimensional range searching for encrypted data receives a query for multidimensional range searching for the first attribute and the second attribute for the plurality of record data (S602).

An apparatus for multidimensional range searching for encrypted data determines one or more ORE indexes that satisfies all of the multidimensional range in the ORE index table for any one of the first attribute and the second attribute (S603).

Here, for determining one or more ORE indexes, an apparatus for multidimensional range searching for encrypted data may determine a position range corresponding to the query according to the order of size of data values for each of the first attribute and the second attribute. Based on an encrypted text in which i) a first position range for a reference attribute that is one of the first attribute and the second attribute, and ii) a second position range for a target attribute that is the other one of the first attribute and the second attribute are encrypted using an ORE key, the one or more ORE indexes may be determined as one or more ORE indexes corresponding to the encrypted text among mapping relations corresponding to the first position range in the ORE index table for the reference attribute.

In addition, among the first attribute and the second attribute, the reference attribute may be determined as an attribute with a smaller number of data among the number of data corresponding to the first position range and the number of data corresponding to the second position range.

In addition, the first position range and the second position range may be determined based on a frequency table for each of the reference attribute and the target attribute, respectively. Here, the frequency table may be composed of frequency of data values for a specific attribute for the plurality of record data.

An apparatus for multidimensional range searching for encrypted data determines a response to the query based on the one or more ORE indexes (S604).

Here, when a search index table is generated for each of the first attribute and the second attribute, one or more encrypted indexes corresponding to the position values of the reference attribute for the one or more ORE indexes in the search index table for the reference attribute may be determined.

In addition, when a database is constructed by encrypting the plurality of record data using a secret key, one or more record data obtained from the database using one or more indexes obtained by decrypting the one or more encrypted indexes may be determined as the response.

Figure 7:
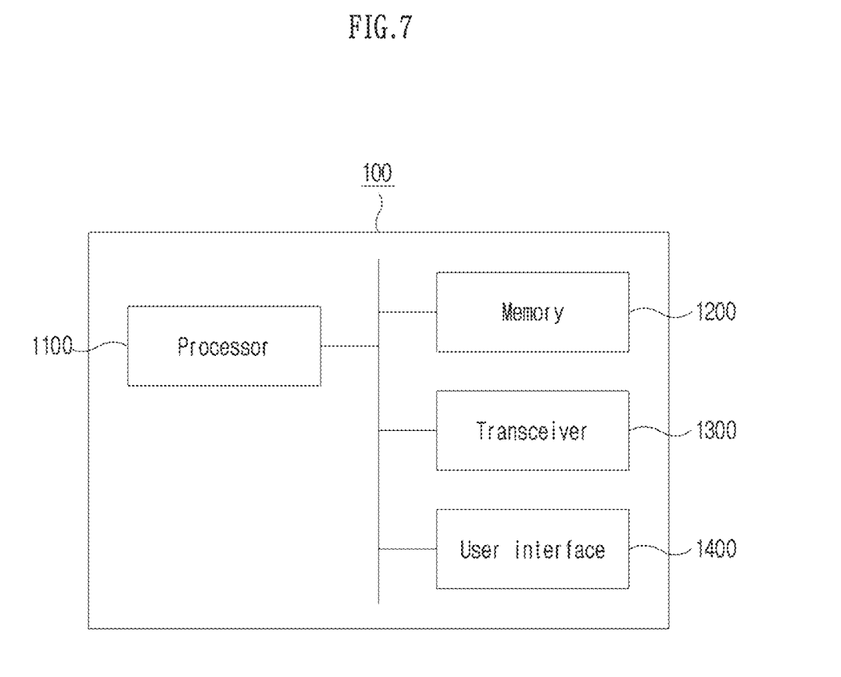
FIG. 7 is a block diagram of an apparatus for multidimensional range searching for encrypted data according to an embodiment of the present disclosure.

FIG. 7 is a block diagram of an apparatus for multidimensional range searching for encrypted data according to an embodiment of the present disclosure.

The apparatus 100 (e.g. the client agent 120 in FIG. 1 or 3) for multidimensional range searching for encrypted data may include one or more processors 1100, one or more memories 1200, one or more transceivers 1300, and one or more user interfaces 1400. The memory 1200 may be included in the processor 1100 or may be configured separately. The memory 1200 may store instructions that, when executed by the processor 1100, cause the apparatus 1000 to perform an operation. The transceiver 1300 may transmit and/or receive signals and data that the apparatus 1000 exchanges with other entities. The user interface 1400 may receive a user's input regarding the apparatus 100 or provide an output of the apparatus 100 to the user. Among the components of the apparatus 100, components other than the processor 1100 and the memory 1200 may not be included in some cases, and other components not shown in FIG. 7 may be included in the apparatus 100.

The processor 1100 may be configured to enable the above-described apparatus 100 to perform methods according to various examples of the present disclosure. Although not shown in FIG. 7, the processor 1100 may be configured to implement or execute a set of software modules that perform each method/function proposed in this disclosure. For example, the processor 1100 may include or may be physically implemented by analog and/or digital circuits including one or more of a logic gate, an integrated circuit, a microprocessor, a microcontroller, a memory circuit, a passive electronic component, an active electronic component, an optical component, and the like, and may be configured to execute software and/or firmware to perform the functions or operations described herein. The transceiver 1300 may include any one or any combination of a digital modem, a radio frequency (RF) modem, an antenna circuit, a WiFi chip, not being limited thereto, configured to execute software and/or firmware to perform the functions or operations described herein. The user interface 1400 may include at least one of a computer keyboard, a mouse, a touch or touchless sensor, a microphone, a display, a speaker, not being limited thereto.

The processor 1100 generates an ORE index table for a plurality of record data.

Here, each of the plurality of record data may include data for a plurality of attributes.

In addition, among the plurality of attributes, each ORE index table may be generated for each of a first attribute and a second attribute that allow comparison of size of data values.

In addition, each ORE index table is composed of mapping relations between i) an index indicating an order for size of data values for any one of the first attribute and the second attribute and ii) an ORE index, which is an ORE-based encrypted index indicating an order number for size of data values for the other attribute.

The processor 1100 may generating a search index table for each of the first attribute and the second attribute for the plurality of record data. Here, the search index table may be composed of encrypted indexes of in which indexes for the plurality of record data are encrypted based on order preserving encryption (OPE).

In addition, the processor 1100 may construct a database by encrypting the plurality of record data using a secret key.

In addition, the processor 1100 receives a query for multidimensional range searching for the first attribute and the second attribute for the plurality of record data.

In addition, the processor 1100 determines one or more ORE indexes that satisfies all of the multidimensional range in the ORE index table for any one of the first attribute and the second attribute.

Here, for determining one or more ORE indexes, an apparatus for multidimensional range searching for encrypted data may determine a position range corresponding to the query according to the order of size of data values for each of the first attribute and the second attribute. Based on an encrypted text in which i) a first position range for a reference attribute that is one of the first attribute and the second attribute, and ii) a second position range for a target attribute that is the other one of the first attribute and the second attribute are encrypted using an ORE key, the one or more ORE indexes may be determined as one or more ORE indexes corresponding to the encrypted text among mapping relations corresponding to the first position range in the ORE index table for the reference attribute.

In addition, among the first attribute and the second attribute, the reference attribute may be determined as an attribute with a smaller number of data among the number of data corresponding to the first position range and the number of data corresponding to the second position range.

In addition, the first position range and the second position range may be determined based on a frequency table for each of the reference attribute and the target attribute, respectively. Here, the frequency table may be composed of frequency of data values for a specific attribute for the plurality of record data.

In addition, the processor 1100 determines a response to the query based on the one or more ORE indexes.

Here, when a search index table is generated for each of the first attribute and the second attribute, one or more encrypted indexes corresponding to the position values of the reference attribute for the one or more ORE indexes in the search index table for the reference attribute may be determined.

In addition, when a database is constructed by encrypting the plurality of record data using a secret key, one or more record data obtained from the database using one or more indexes obtained by decrypting the one or more encrypted indexes may be determined as the response.

Components described in exemplary embodiments of the present disclosure may be implemented by hardware elements. For example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in exemplary embodiments may be implemented in a combination of hardware and software.

The method according to an embodiment of the present disclosure may be implemented as a program that can be executed by a computer, and the computer program may be recorded in various recording media such as magnetic storage media, optical read media, and digital storage media.

The various technologies described in this disclosure may be implemented as digital electronic circuits or computer hardware, firmware, software, or a combination thereof. The above technologies may be implemented as a computer program product, that is, a computer program tangibly embodied in an information medium (e.g., a machine-readable storage device (e.g., a computer-readable medium) or a data processing device) or a computer program implemented as signals processed by or propagated by a data processing device to cause the operation of the data processing device (e.g., programmable processor, computer, or multiple computers).

Computer program(s) may be written in any form of programming language, including compiled or interpreted languages and may be distributed as a stand-alone program or in any form, including modules, components, subroutines, or other units suitable for use in a computing environment. A computer program may be executed by a single computer or by multiple computers distributed at one site or multiple sites and interconnected by a communications network.

Examples of processors (e.g., the processor 100 in FIG. 7) suitable for executing computer programs include general-purpose and special-purpose microprocessors, and one or more processors in digital computers. Typically, a processor receives instructions and data from one or more memories (e.g., the memory read-only memory, random access memory, or both. Components of a computer may include at least one processor for executing instructions and one or more memory devices for storing instructions and data. Additionally, the computer may include one or more mass storage devices for data storage, such as magnetic, magneto-optical disks, or optical disks, or may be connected to the mass storage devices to receive and/or transmit data. Examples of information media suitable for implementing computer program instructions and data include optical media such as semiconductor memory devices (e.g., magnetic media such as hard disks, floppy disks, and magnetic tapes), compact disk read-only memory (CD-ROM), digital video disk (DVD), etc., magneto-optical media such as floptical disks, and read only memory (ROM), random access memory (RAM), flash memory, erasable programmable ROM (EPROM), electrically erasable programmable ROM (EEPROM), and other known computer-readable media. Processors and memories can be supplemented or integrated by special-purpose logic circuits.

A processor may run an operating system (OS) and one or more software applications that run on the OS. The processor device may also access, store, manipulate, process and generate data in response to software execution. For simplicity, the processor device is described in the singular, but those skilled in the art will understand that the processor device may include a plurality of processing elements and/or various types of processing elements. For example, a processor device may include a plurality of processors or a processor and a controller. Additionally, different processing structures, such as parallel processors, may be configured. Additionally, computer-readable media refers to all media that a computer can access, and may include both computer storage media and transmission media.

Although this disclosure includes detailed descriptions of various detailed implementation examples, the details should not be construed as limiting the invention or scope of the claims proposed in this disclosure, but rather illustrating features of specific exemplary embodiments.

Features individually described in exemplary embodiments in this disclosure may be implemented by a single exemplary embodiment. Conversely, various features described in this disclosure with respect to a single exemplary embodiment may be implemented by a combination or appropriate sub-combination of a plurality of exemplary embodiments. Furthermore, in the present disclosure, the features may operate by a specific combination, and the combination may initially be described as claimed, however, in some cases, one or more features may be excluded from the claimed combination, or claimed combinations may be modified in the form of sub-combinations or modifications of sub-combinations.

Similarly, even if operations are depicted in a specific order in the drawings, it should not be understood that execution of the operations in a specific order or sequence is necessary, or that performance of all operations is required to obtain a desired result. In certain cases, multitasking and parallel processing can be useful. Additionally, it should not be understood that the various device components in all exemplary embodiments are necessarily separate, and the above-described program components and devices may be packaged in a single software product or multiple software products.

The exemplary embodiments disclosed herein are illustrative only and are not intended to limit the scope of the disclosure. Those skilled in the art will recognize that various modifications may be made to the exemplary embodiments without departing from the scope of the claims and their equivalents.

Accordingly, this disclosure is intended to include all other substitutions, modifications and changes that fall within the scope of the following claims.

What is claimed is:

1. A method for multidimensional range searching for encrypted data, the method comprising:
    generating an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute;
    receiving a query for multidimensional range searching for the first attribute and the second attribute for the plurality of record data;
    determining one or more ORE indexes that satisfies all of the multidimensional range in the ORE index table for any one of the first attribute and the second attribute; and
    determining a response to the query based on the one or more ORE indexes.

2. The method of claim 1, further comprising:
    determining a position range corresponding to the query according to the order for size of data values for each of the first attribute and the second attribute.

3. The method of claim 2,
    wherein based on an encrypted text in which i) a first position range for a reference attribute that is one of the first attribute and the second attribute, and ii) a second position range for a target attribute that is the other one of the first attribute and the second attribute are encrypted using an ORE key, the one or more ORE indexes are determined as one or more ORE indexes corresponding to the encrypted text among mapping relations corresponding to the first position range in the ORE index table for the reference attribute.

4. The method of claim 3,
    wherein among the first attribute and the second attribute, the reference attribute is determined as an attribute with a smaller number of data among the number of data corresponding to the first position range and the number of data corresponding to the second position range.

5. The method of claim 3,
    wherein the first position range and the second position range are determined based on a frequency table for each of the reference attribute and the target attribute, respectively, and
    wherein the frequency table is composed of frequency of data values for a specific attribute for the plurality of record data.

6. The method of claim 3, further comprising:
    generating a search index table for each of the first attribute and the second attribute for the plurality of record data, wherein the search index table is composed of encrypted indexes of in which indexes for the plurality of record data are encrypted based on order preserving encryption (OPE).

7. The method of claim 6,
wherein one or more encrypted indexes that correspond to position values of the reference attribute for the one or more ORE indexes are determined in the search index table for the reference attribute.

8. The method of claim 7, further comprising:
constructing a database by encrypting the plurality of record data using a secret key.

9. The method of claim 8,
wherein one or more record data obtained from the database using one or more indexes obtained by decrypting the one or more encrypted indexes are determined as the response.

10. An apparatus for multidimensional range searching for encrypted data, the apparatus comprising:
at least one processor; and
at least one memory operably connected to the at least one processor and storing instructions that, when executed by the at least one processor, cause the apparatus to perform operations comprising:
generating an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute;
receiving a query for multidimensional range searching for the first attribute and the second attribute for the plurality of record data;
determining one or more ORE indexes that satisfies all of the multidimensional range in the ORE index table for any one of the first attribute and the second attribute; and
determining a response to the query based on the one or more ORE indexes.

11. The apparatus of claim 10, the operations further comprising:
determining a position range corresponding to the query according to the order for size of data values for each of the first attribute and the second attribute.

12. The apparatus of claim 11,
wherein based on an encrypted text in which i) a first position range for a reference attribute that is one of the first attribute and the second attribute, and ii) a second position range for a target attribute that is the other one of the first attribute and the second attribute are encrypted using an ORE key, the one or more ORE indexes are determined as one or more ORE indexes corresponding to the encrypted text among mapping relations corresponding to the first position range in the ORE index table for the reference attribute.

13. The apparatus of claim 12,
wherein among the first attribute and the second attribute, the reference attribute is determined as an attribute with a smaller number of data among the number of data corresponding to the first position range and the number of data corresponding to the second position range.

14. The apparatus of claim 12,
wherein the first position range and the second position range are determined based on a frequency table for each of the reference attribute and the target attribute, respectively, and
wherein the frequency table is composed of frequency of data values for a specific attribute for the plurality of record data.

15. The apparatus of claim 12, the operations further comprising:
generating a search index table for each of the first attribute and the second attribute for the plurality of record data,
wherein the search index table is composed of encrypted indexes of in which indexes for the plurality of record data are encrypted based on order preserving encryption (OPE).

16. The apparatus of claim 15,
wherein one or more encrypted indexes that correspond to position values of the reference attribute for the one or more ORE indexes are determined in the search index table for the reference attribute.

17. The apparatus of claim 16, the operations further comprising:
constructing a database by encrypting the plurality of record data using a secret key.

18. The apparatus of claim 17,
wherein one or more record data obtained from the database using one or more indexes obtained by decrypting the one or more encrypted indexes are determined as the response.

19. At least one non-transitory computer-readable medium storing at least one instruction, wherein the at least one instruction executable by at least one processor controls an apparatus for multidimensional range searching for encrypted data to:
generate an order revealing encryption (ORE) index table for a plurality of record data, wherein each of the plurality of record data includes data for a plurality of attributes, wherein among the plurality of attributes, each ORE index table is generated for each of a first attribute and a second attribute that allow comparison of size of data values, and wherein the each ORE index table is composed of mapping relations between i) an index indicating an order for size of data values for any one of the first attribute and the second attribute and ii) an ORE index, which is an ORE-based encrypted index indicating an order number for size of data values for the other attribute;
receive a query for multidimensional range searching for the first attribute and the second attribute for the plurality of record data;
determine one or more ORE indexes that satisfies all of the multidimensional range in the ORE index table for any one of the first attribute and the second attribute; and
determine a response to the query based on the one or more ORE indexes.

* * * * *